United States Patent [19]

Clay et al.

[11] Patent Number: 4,667,472

[45] Date of Patent: May 26, 1987

[54] ELECTRIC INTEGRATED ACTUATOR WITH VARIABLE GAIN HYDRAULIC OUTPUT

[75] Inventors: C. William Clay, Federal Way; Curtiss W. Robinson, Seattle, both of Wash.

[73] Assignee: The Boeing Company, Seattle, Wash.

[21] Appl. No.: 687,198

[22] Filed: Dec. 28, 1984 (Under 37 CFR 1.47)

[51] Int. Cl.[4] .......................................... F16D 31/02
[52] U.S. Cl. ........................................ 60/387; 60/390; 60/391; 60/475; 60/476; 277/27; 92/86
[58] Field of Search ................ 60/473, 475, 476, 455, 60/415, 432, 414, 390, 391, 387; 277/3, 72, 15, 75, 27; 92/82, 86

[56] References Cited

U.S. PATENT DOCUMENTS

| | | | |
|---|---|---|---|
| 2,243,978 | 6/1941 | Reader | 103/49 |
| 2,264,375 | 12/1941 | Hill et al. | 137/153 |
| 2,283,516 | 5/1942 | Tyler | 60/52 |
| 2,624,283 | 1/1953 | Hirvonen | 103/11 |
| 2,707,002 | 4/1955 | Harris | 138/31 |
| 2,801,618 | 8/1957 | Place et al. | 92/86 |
| 2,966,890 | 1/1961 | Panissidi | 121/41 |
| 3,133,503 | 5/1964 | Sheler | 103/49 |
| 3,188,963 | 6/1965 | Tyler | 103/2 |
| 3,385,169 | 5/1968 | Hale et al. | 91/390 |
| 3,410,177 | 11/1968 | Roess et al. | 91/361 |
| 3,570,243 | 3/1971 | Comer et al. | 60/52 |
| 3,593,824 | 7/1971 | Gregory | 187/26 |
| 3,646,754 | 3/1972 | Koch et al. | 60/52 |
| 3,798,525 | 3/1974 | Cooper | 91/361 |
| 3,838,934 | 10/1974 | Petroff | 408/7 |
| 3,911,679 | 10/1975 | Matthews | 60/413 |
| 3,920,966 | 11/1975 | Knemeyer et al. | 235/150 |
| 3,963,039 | 6/1976 | Coeurderoy | 137/118 |
| 3,972,396 | 8/1976 | Bochnak | 92/86 |
| 3,995,529 | 12/1976 | Bach et al. | 91/28 |
| 4,034,566 | 7/1977 | Suketomo et al. | 60/548 |
| 4,036,106 | 7/1977 | Athy, Jr. | 91/5 |
| 4,041,704 | 8/1977 | Gygli | 60/473 |
| 4,085,587 | 4/1978 | Garlinghouse | 60/403 |
| 4,192,337 | 3/1980 | Alderson et al. | 137/101 |
| 4,242,867 | 1/1981 | Belart | 60/405 |
| 4,294,162 | 10/1981 | Fowler et al. | 91/434 |
| 4,303,089 | 12/1981 | Gage et al. | 137/113 |
| 4,313,165 | 1/1982 | Clelford et al. | 364/424 |
| 4,355,358 | 10/1982 | Clelford et al. | 364/424 |

FOREIGN PATENT DOCUMENTS

| | | | |
|---|---|---|---|
| 0012165 | 1/1982 | Japan | 277/27 |
| 387069 | 4/1965 | Sweden | 277/27 |

Primary Examiner—A. Michael Chambers
Attorney, Agent, or Firm—Bruce A. Kaser

[57] ABSTRACT

This invention relates to integrated electro-hydraulic actuators for use aboard aircraft or elsewhere. A balanced, double-acting hydraulic ram or motor (12) is connected between a support (16) and a member to be moved relative to the support. The ram includes first and second changeable volume hydraulic chambers (30, 32). A reversible hydraulic pump (38) is connected by a pair of conduits (44, 46) to the ram chambers (30, 32). The pump (38) displaces hydraulic fluid from one chamber to another for the purpose of causing a pressure differential between them. A hydraulic accumulator (60) provides leakage makeup fluid to the actuator, and further provides a quiescent pressure to the actuator when it is in a substantially nonoperative condition. A conduit (62) may connect the accumulator (60) to the ram (12). A laminar leakage flow path within the actuator permits hydraulic connection of the accumulator (60) to the ram (12) without use of valves.

5 Claims, 3 Drawing Figures

ELECTRIC INTEGRATED ACTUATOR WITH VARIABLE GAIN HYDRAULIC OUTPUT

TECHNICAL FIELD

This invention relates to hydraulic actuators for use aboard aircraft in space limited areas such as wing surface envelopes and the like. More particularly, the invention relates to a balanced, electrically powered double-acting hydraulic actuator that may be hydraulically independent from other similar actuators and/or other systems such as a main hydraulic system aboard an aircraft.

BACKGROUND ART

It is generally always a goal of aircraft designers to design aircraft mechanical components that are reliable, small-sized, and lightweight. This is particularly true for the various actuators utilized aboard aircraft for moving flaps, ailerons, elevators, and similar surfaces. Usage of actuators of a hydraulic type for such purpose is well-known in the art.

Because of their ability to be constructed in relatively small sizes, the ram/cylinder portions of hydraulic actuators are well-suited for operating aircraft flaps, ailerons, etc., since they may be designed to easily fit within wing surface envelopes. In the past, actuators of this type have been used in combination with a main or centralized hydraulic system aboard an aircraft. In this type of arrangement, the actuators are basically in the form of a cylinder and piston arrangement placed within a lifting surface envelope, with pressurized hydraulic fluid being supplied to the actuators from the main system by a network of fluid conduits. Although individual actuators would be independently operable, each actuator would not be independent from the others in the sense that each actuator must rely on the main system as a source of supply of pressurized hydraulic fluid.

There are at least two disadvantages to the above type of system. One disadvantage is that such a system tends to increase aircraft weight in large aircraft since a relatively complex network of hydraulic conduits is required to supply hydraulic fluid from the main system to the various actuators distributed throughout the aircraft. The other disadvantage is that if the main system should happen to fail, all of the actuators to which the system supplies fluid would become inoperable.

In an effort to overcome these disadvantages, aircraft designers have developed actuators that are independently operable but do not rely on a main or centralized hydraulic fluid system. Such developments have included the development of all-electric actuators wherein all hydraulics are totally eliminated. Other developments have included the development of small-sized hydraulic actuators designed to be independent units. In this latter case, each actuator may have an independent pump for providing pressurized hydraulic fluid. The hydraulic system of each actuator is integrated as part of the actuator so that individual actuators are not dependent on a main system or other actuator systems. Such an isolated unit is commonly called an "Integrated Actuator Package" or IAP. Dowty Rotol, Ltd. of Bristol, Great Britain has been known to develop actuators of this type. The actuator of the present invention is also of this general type, but is not necessarily limited to IAP actuators that are of a small size.

The features and advantages of the present invention will now be explained and will become apparent to the reader after reading the remaining parts of this application.

DISCLOSURE OF THE INVENTION

The present invention is suitable for use on an IAP type electro-hydraulic actuator unit. For example, such an actuator may include a balanced, double-acting hydraulic ram connected between a support and a member to be moved relative to the support. The support could be a frame inside a wing surface envelope, and the member to be moved could be a control surface on the wing.

The ram may include a cylinder portion having first and second end openings, and a balanced piston movably received within the cylinder portion. The cylinder and the piston define a pair of first and second hydraulic fluid chambers, with the volume of each chamber changing as the piston moves within the cylinder. The first end opening provides a passageway from the first chamber to the outside of the ram, and the second end opening provides a passageway from the second chamber to the outside of the ram. A pair of first and a second rod members extend through the first and second end openings, respectively. The rod members are connected to the piston so that they move in and out of the end openings in response to movement of the piston in the cylinder. The piston normally moves as a result of a pressure differential in the hydraulic fluid in the ram chambers. A reversible hydraulic pumping means, or pump, may be connected to the first and second chambers for the purpose of pumping hydraulic fluid from one chamber to the other to cause such a pressure differential.

In accordance with the present invention, the actuator unit includes a hydraulic fluid accumulator, for providing makeup hydraulic fluid, to keep the hydraulic fluid in the actuator and the casing of the pump at a certain pressure level when the actuator is in a substantially quiescent state. A conduit means may provide a fluid flow path for communicating hydraulic fluid from the accumulator to the first and second chambers, and to the pump. A laminar leakage flow means may be positioned in the conduit means between the accumulator and those chambers. What this means is that the laminar leakage flow means may replace any valve structure that might otherwise be necessary to hydraulically connect the accumulator to other parts of the actuator. Such laminar leakage flow means should be in the form of a fluid flow passageway formed between two moving surfaces. This permits such passageway to be self cleaning thereby preventing blockage due to slit accumulation.

A sealing means may be positioned in each end opening of the ram for the purpose of preventing leakage of hydraulic fluid from the first and second chambers to the outside of the ram. In one embodiment of the invention, the sealing means may comprise an inner and outer seal in each end opening, with the seals being spaced apart so as to define a region between them. In this embodiment, the conduit means may define a fluid flow path from the accumulator to the region between the seals in each end opening, and the inner seal may be of a type to permit laminar leakage flow from the region in each end to its respective chamber. In this manner, the accumulator may provide leakage makeup flow to the actuator for the purpose of compensating for leakage, and the accumulator may also provide a quiescent pressure to the hydraulic fluid in the chambers and the pump. The inner seal may be in the form of a labyrinth seal, or alternatively, the inner seal may be in the form of a metallic piston ring type seal.

In another embodiment of the invention, the laminar leakage flow means may be provided in the pump. It should be appreciated that such a pump would not be a conventional aircraft type high pressure pump. A person skilled in the art would realize that a conventional aircraft pump would have to be modified by way of altering valve commutator design and piston return mechanisms to make the pump work well in the above application. It is possible that gear and vane type pumps may be suitable for such application.

The pumping means may include a reversible electric motor housed within the pump casing. The motor may have an output shaft positioned in the first portion of the casing, with the shaft being operably connected to a suitable pump also housed within the casing. By way of example, the pumping means could be in the form of a variable displacement hydraulic pump driven by a brushless DC electric motor. Such a motor could be a D.C. permanent magnet type, for example, using samarium cobalt or other rare earth magnets.

One of the advantages of the present invention is that it provides a small-sized integrated electro-hydraulic actuator (IAP) that is efficiently packaged, making it suitable for use in space-limited areas aboard aircraft. For example, the pump casing (including the electric motor), and the accumulator, may all be mounted on and carried by the ram or cylinder portion of the actuator.

Another advantage of the present invention is that an actuator constructed in accordance with this invention limits external leakage paths to only the seals at the end openings of the cylinder. In other words, the only dynamically sealed leakage path for hydraulic fluid to leak from the actuator to the outside of the ram exists between the rod members and the end openings of the cylinder.

Another advantage of the present invention is that the present invention provides an actuator wherein the position of the rod members may solely be a function of pump velocity. In the past, IAP type actuators have been controlled by variable displacement pumps, wherein the pump is usually continuously operating at a fixed speed, and the actuator position is changed by altering the pump displacement. In the invention of the present case, it is not necessary to utilize a variable displacement pump. Actuator position may be governed solely by changing the velocity of the pump. When the pump is in a nonoperative condition, the accumulator provides hydraulic pressure to the actuator that is sufficient to maintain a quiescent condition. If a loading should suddenly be placed on the actuator, the actuator is provided with adequate control circuitry to respond to such loading in such a manner so that the pump motor is activated to provide sufficient pressure to respond to the loading. The advantage of this arrangement is obvious. Since the pump of the actuator of the present invention case is not continuously operating, the actuator therefore utilizes much less electrical power.

Still another advantage of the present invention is that it may provide a small-sized integrated electro-hydraulic actuator that has a high dynamic response capability. One possible application of the present invention would include a pumping means having a variable displacement hydraulic pump driven by an electric motor. The variable displacement feature would provide an adjustable mechanical gain between rotation of the electric motor and the loading caused by the surface or member to be moved by the actuator. This feature could therefore be used to adjust torque delivered by the electric motor in accordance with varying load demands resulting from loading on the member to be moved. A variable gain feature enhances the ability of an electric motor of limited size to produce large steady output torques without demanding excessive electrical current from a supply system that provides electrical power to the motor.

BRIEF DESCRIPTION OF THE DRAWINGS

Referring now to the accompanying drawings, which are for descriptive purposes only, like reference numerals refer to like parts throughout, and.

BEST MODE FOR CARRYING OUT THE INVENTION

Figure 1:
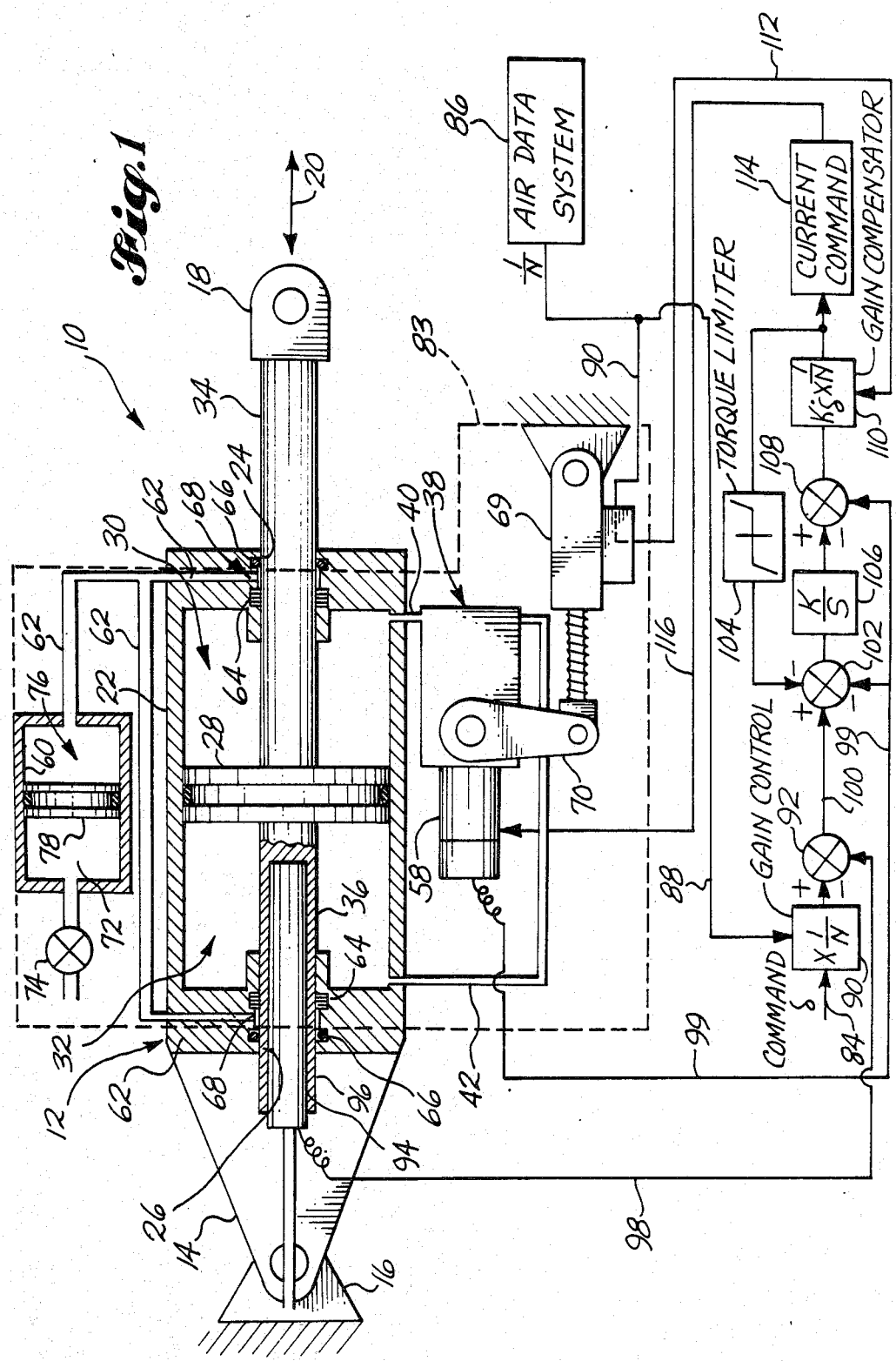
FIG. 1 is a schematic view of a integrated electro-hydraulic actuator constructed in accordance with one embodiment of the present invention, and shows a sectional view of a balanced, double-acting hydraulic ram, with a gas charged accumulator being connected to the ram, and further shows a side elevation of an electrically powered pump for actuating the ram, with control circuitry for the pump also being shown.

Referring now to the drawings, and first to FIG. 1, therein is shown an integrated electro-hydraulic actuator 10 constructed in accordance with a preferred embodiment of the present invention. The actuator 10 includes a balanced, double-acting ram 12 that is connected at a first end 14 to a support 16. Another end 18 of the ram 12 may be moved back and forth in the directions indicated by arrows 20 to move a member such as a control surface, (not shown) relative to the support 16.

The ram 12 includes a cylinder portion 22 that has first and second end openings 24 and 26. A balanced piston 28 is slidably or movably received within the cylinder portion 22. The piston 28 and the cylinder 22 define first and second hydraulic fluid chambers 30 and 32. The first end opening 24 provides a passageway from the first hydraulic chamber 30 to the outside of the ram. Likewise, the second end opening 26 provides a passageway from the second hydraulic chamber 32 to the outside of the ram 12. A pair of first and second rod members 34, 36 extend through the first and second end openings 24, 26, respectively. The rod members are connected to the piston 28 so that they move in and out of the end openings 24, 26, in the directions shown by arrows 20, in response to movement of the piston 28 in the cylinder 22. Movement of the piston 28, is caused by a pressure differential between the hydraulic fluid in the chambers 30, 32. The pressure differential is brought about by a pump 38 that displaces hydraulic fluid from one chamber to the other.

The pump 38 would be of a type that is reversible. For example, the pump 38 may be a reversible variable displacement hydraulic pump. The pump 38 may have port means in the form of a pair of inlet/outlet ports 40 and 42. By way of example, the inlet/outlet port 40 is schematically shown as being connected to the first chamber 30. Likewise, the inlet/outlet port 42 is schematically shown as being connected to the second chamber 32.

Depending on the direction of rotation of the pump 38, one of the inlet/outlet ports 40, 42 will output a high pressure flow to one of the chambers 30, 32, and the other inlet port will input a low pressure flow from the other chamber into the pump. In this manner, a pressure differential is caused in the chambers by displacing fluid from one chamber to the other, and the piston 28 moves back and forth in the cylinder 22 in response. The pump 38 may be driven by a reversible electric motor 58 connected to the pump so that no external leakage path exists between the pump and motor. Such a motor and pump construction eliminates the need for a rotating high pressure seal between the output shaft of the motor and the pump. A person skilled in the art would be familiar with this concept.

The angle of the swash plate in the variable displacement pump 38 may be adjustable if desired. Adjusting the angle of the swash plate provides a means for adjusting the mechanical gain between the torque output of the electric motor 58 and the hydraulic output of the pump 38. Referring back to FIG. 1, such adjustment may be accomplished by an electro-mechanical gain control actuator 69 connected to the swash plate of the pump by means of a linkage arm 70. The advantage of utilizing the variable gain resulting from adjusting the swash plate is that it enhances the ability of the motor 58 to produce a steady output at high torque levels without demanding excessive current or torque capability from the electric motor. The electric motor may be controlled by certain electronic elements shown in FIG. 1, which will be described later herein.

The general construction of the above-described ram 12 and the electric motor and pump 58, 38, and the connection of the pump to the ram, would all be well-known to a person skilled in the art.

Makeup hydraulic fluid is provided to the ram 12 and the pump casing 48 by a hydraulic fluid accumulator 60. The accumulator 60 may be of a gas charged type, wherein pressurized gas is initially charged in chamber 72 of the accumulator by means of a valve 74. Another accumulator chamber 76 contains hydraulic fluid, with a piston (or diaphragm) 78 separating the gas chamber 72 from the hydraulic fluid chamber. The pressure in the gas chamber 72 forces the piston 78 against hydraulic fluid in chamber 76. A conduit 62 leads out of the chamber 76 permitting pressurized hydraulic fluid to be output therefrom. Although the accumulator 60 has been described herein as a gas-charged type, other types would be suitable, and may be preferable.

Figure 2:
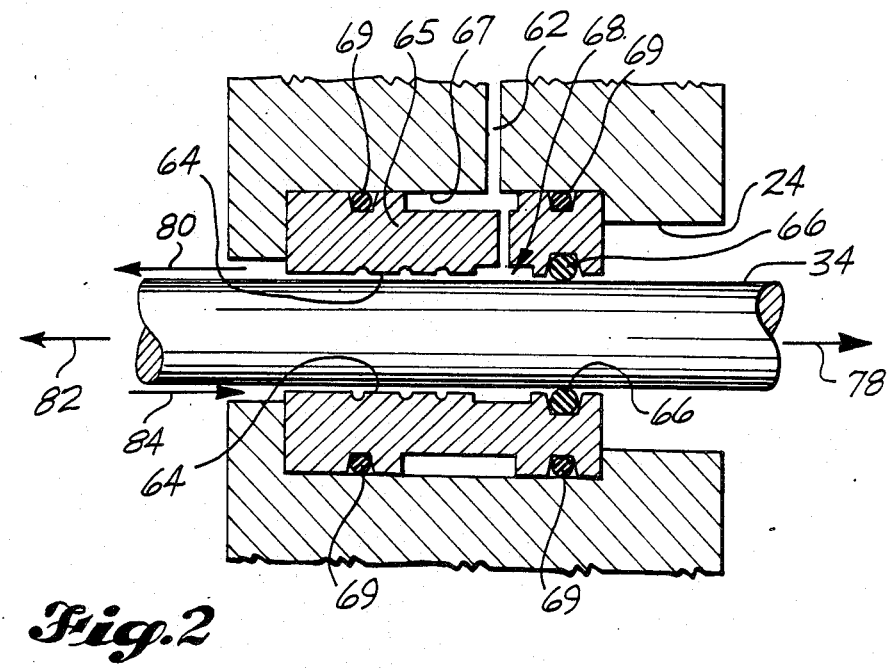
FIG. 2 is an enlarged fragmentary cross-sectional view of the right end opening of the hydraulic ram shown in FIG. 1, and shows an elevational fragmentary view of a rod member extending through the opening.

In a first embodiment of the invention, shown in FIG. 1, in each end opening 24, 26 of the ram 12 there is a pair of inner and outer seals 64, 66. Referring now to FIG. 2, which shows an enlarged view of end opening 24, the inner and outer seals 64, 66 in each end opening 24, 26 are spaced apart so as to define a region (indicated generally by arrow 68) to which fluid from the accumulator 60 is delivered. The fluid is delivered by the conduit 62 leading out from the accumulator chamber 76. The outer seal 66 is of a type that prevents external leakage from the end 24. The inner seal 64 is of a type that permits laminar leakage flow communication between the region 68 and the ram chamber 30. As is shown in FIG. 2, the inner and outer seal 64, 66 may be installed in the end 24 as part of an assembly comprising a member 65 inserted within a bored region 67 in the end 24. Another pair of seals 69 may be positioned between the insert 65 and the end 24 of the ram.

In the example provided by FIG. 2, flow communication would be between the region 68 and the ram chamber 30. The direction of the leakage would depend on the sense of the pressure differential within the ram 12. This, of course, would be governed by the direction of rotation of the pump 38, and the pressure differential between the chambers 30, 32. For example, when the pump 38 is operating to move the end 18 from left to right, in the direction indicated by arrow 78 in FIG. 2, the pressure of the hydraulic fluid in chamber 30 would be less than the pressure of the fluid in chamber 32. For example, the pressure differential between the two chambers could be on the order of 2,000±2,000 psi. The accumulator 60 would communicate a fluid pressure to the region 68 at a value that is intermediate to the higher pressure in chamber 32 and the lower pressure in chamber 30. In preferred form, and by way of example, the accumulator pressure level should be set to be approximately ½ of the peak expected cylinder 12 working pressure under load. Therefore, in this example, hydraulic fluid communicated by the accumulator 60 through conduit 62 to the region 68 would have a higher pressure than the pressure in chamber 30. The laminar leakage path provided by inner seal 64 would thus permit flow from the region 68 into the chamber 30. The direction of such flow is indicated generally by arrow 80. If, on the other hand, the operation of the pump 38 should be reversed, then the pressure in chamber 30 would be higher than the pressure in chamber 32 (the ram end 18 would move in the direction of arrow 82). In such case, the pressure in chamber 30 would now be higher than the pressure communicated by the accumulator 60 to region 68, and laminar leakage would occur from the chamber 30 in the direction indicated by arrow 84.

As can be seen in FIG. 1, the conduit 62 also connects the region 68 in each end opening 24, 26. This balances the laminar leakage in the ends. For example, laminar leakage from a high pressure chamber into region 68 at one end is communicated by the conduit 62 to the region 68 at the other end, which would be adjacent a low pressure chamber. There would then be laminar leakage of this flow into the low pressure chamber.

The inner laminar seal 64 provides a hydraulic connection between the ram 12 and the accumulator 60 and eliminates the need for placement of a valve between them. The configuration of an inner laminar seal 64 and an outer seal 66 as shown in FIG. 2 would, of course, be the same for both of the end openings 24 and 26 in the ram 12. The inner seal 64 would provide a laminar leakage path between the region 68 and the chamber which is adjacent each respective inner seal. The outer seal 66 is of a type that prevents external leakage from the region 68 to the outside of the ram 12. By way of example only, the inner seal 64 may be in the form of either a labyrinth seal or a metallic piston ring seal. The outer seal 66 may be in the form of a typical O-ring seal.

As was described above for the embodiment shown in FIG. 1, the accumulator 60 may provide hydraulic fluid flow to and from the ram 12 by laminar leakage flow paths in the ends 24, 26 of the ram. The pressure of the fluid provided by the accumulator 60 may also be communicated onward into the pump casing 48 by pump piston clearances. Therefore, in this manner, the accumulator 60 may provide leakage makeup fluid to compensate for any external leakage occurring through the end openings 24, 26, and the accumulator may also provide a quiescent pressure to the actuator when the pump is at rest. The quiescent pressure would be provided to both the ram chambers 30, 32 and the pump casing 48.

To summarize, the actuator volume indicated by the dashed line 83 represents a pressurized volume wherein there are only two paths for external leakage of hydraulic fluid from the actuator. An advantage to the present invention is that it is possible to include the various elements, i.e., the actuator 60, pump 38, electric motor 58, and gain control actuator 69, housed within a common hydraulically pressurized case. What this means is that external leakage paths exist only between the external seals 66 and the actuator rod members 34, 36.

In FIG. 1, the electronics controls for the actuator 10 are schematically shown and will now be described. The electro-hydraulic actuator 10 may have an electrical control system in which an actuator controlling input signal from a particular source is modified and/or amplified so that the actuator may be used to apply a load. A measure of the output position of the actuator, also in the form of an electrical signal, may be fed back to the electrical control system for the purpose of comparison with the input signal. The difference between the measure of the input and output signals may be used with the input signal to variably drive the electric motor in the actuator system until the difference between input and output signals is zero.

In the embodiment shown in FIG. 1, input signals must be supplied from both a pilot-controlled signal, indicated generally by arrow 84, and a command signal from an air data system 86. Command signals from the air data system 86 are indicated generally by line 88 in FIG. 1. The air data system 86 provides command signals to the gain control actuator 69 for the purpose of altering the angle of a pump swash plate. Command signals from the air data system 86 to the actuator 69 are indicated generally by 90.

Gain control signals through either lines 84 or 88 are received by a gain control circuit 90. The gain control circuit 90 adjusts the input signal gain to a summing amplifier 92. The position of the ram end 18 is monitored by a linear variable displacement transducer (LVDT), or an equivalent transducer, 94 positioned in the end 96 of rod member 36, or elsewhere as desired. The LVDT 94 provides displacement information regarding the position of the ram end 18 at all times. Signals from the LVDT, indicated generally by line 98, are received by the summing amplifier 92. In addition, tachometer feedback information from the electric motor 58 may be transmitted from a tachometer, connected to the motor shaft, to the summing amplifiers 102 and 108. Signals from the tachometer are indicated generally by line 99.

The summing amplifier 92 receives the signals from the gain control circuit 90, and the LVDT 94, compares them, and then may output an error signal indicated generally by arrow 100. Such error signal is received by another summing amplifier 102. This second summing amplifier 102 may also receive tachometer feedback information (line 99), and further, it may also receive torque limiting information from a torque limiter circuit 104. The summing amplifier 102 compares these signals and will output an error signal to an integrating amplifier shown schematically by 106. The integrating amplifier 106 processes the signal from the summing amplifier 102 and outputs another signal to a third summing amplifier 108. This third summing amplifier compares the output from circuit 106 with the tachometer feedback signal 99. If an error signal is generated by the third summing amplifier 108, such signal is received by a gain compensator circuit 110.

Output from the gain compensator circuit is received by the torque limiter circuit 104 for the purpose of limiting the torque output of the electric motor 58. As was described previously, output of the torque limiter circuit 104 is fed back to the second summing amplifier 102. The gain compensator circuit 110 also receives signals, indicated by line 112, from the actuator 68 that indicate mechanical gain in the pump 38. Output from the gain compensator circuit 110 is transmitted to a current command circuit 114 which then provides an appropriate amount of electrical current to the electric motor 58, as indicated generally by line 116, for the purpose of driving the pump 38.

Figure 3:
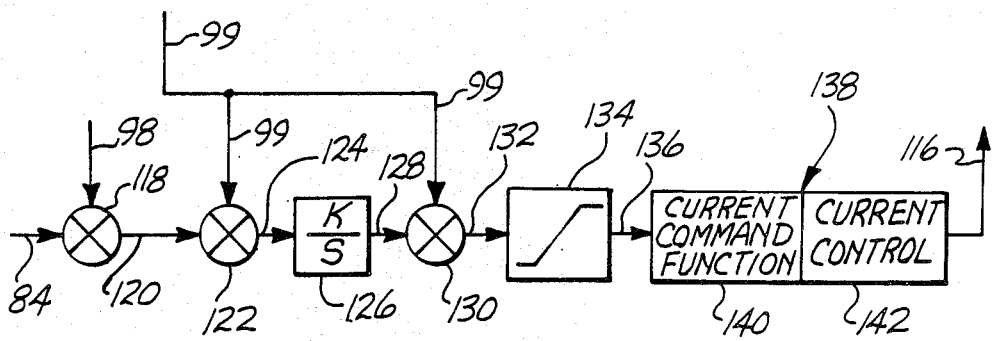
FIG. 3 is a schematic view of control circuitry for the actuator of FIG. 1, wherein such circuitry may be used to control the actuator when the actuator is driven by a fixed rather than a variable displacement pump.

In an alternate embodiment, the actuator 10 may utilize a pump 38 that is a fixed rather than a variable displacement pump. In other words, the pump 38 would not have a swash plate wherein the plate angle may be adjusted by an actuator, like the actuator 69 in FIG. 1. If this is the case, then the control circuitry for the actuator 10 would be different than the control circuitry shown in FIG. 1. Referring now to FIG. 3, therein is shown circuitry for the actuator 10 when gain control is not used in the pump 38.

In a manner similar to the circuitry shown in FIG. 1, a command signal 84 is received by a summing amplifier 118. The summing amplifier 118 also receives a position information signal 98 from the LVDT 94. The summing amplifier 118 compares the command signal 84 with the LVDT signal 98, and if the actuator position is not in accordance with the command signal, the summing amplifier 118 outputs an error signal which is indicated generally by arrow 120. The error signal 120 is then received by another summing amplifier 122. This second summing amplifier 122 also receives tachometer feedback information (line 99), which is compared with the error signal 120. The second amplifier 122 compares the tachometer signal 99 and the error signal 122 and outputs an error signal 124 to an integrating amplifier, which is generally shown by arrow 126. The integrating amplifier 126 processes the signal 124 from the summing amplifier 122, and outputs another signal 128 to a third summing amplifier 130. This third summing amplifier 130 also receives the tachometer feedback signal 99. The summing amplifier 130 compares the tachometer signal 99 with the integrating amplifier signal 128 and generates an error signal 132 that is transmitted to a torque limiter circuit 134. The torque limiter circuit 134 may be provided in the actuator control circuit for the purpose of limiting the torque output of the electric motor 58 of FIG. 1. An output signal 136 from the torque limiter circuit 134 is then transmitted to a current command circuit 138. The current command circuit 138 includes current command 140 and current control functions 142. The current command function 140 would also include current feedback. The current command circuit 138 outputs an appropriate amount of electrical current to the electrical motor 58, such output being indicated generally by line 116.

Upon reading the foregoing description, it should be apparent to the reader that various changes may be made in the form, construction, and arrangements of the various parts of the invention without departing from the spirit and scope thereof. The description as provided hereinabove was provided solely by way of example and should not be taken in the limiting sense. The spirit and scope of the present invention should be limited only by the appended claims which follow.

What is claimed is:

1. An improved electro-hydraulic actuator for use aboard an aircraft, said actuator being of a balanced, double-acting type and including a ram cylinder in which is received a movable piston dividing said cylinder into first and second ram chambers whose volume is variable depending on the position of said piston in said cylinder, and a pair of rods, each rod having an inner end connected to said piston, with said rods extending outwardly away from said piston in opposite directions from each other, one rod extending through said first chamber and the other rod extending through said second chamber, each of said chambers having an end opening, said end openings being positioned in opposite ends of said cylinder, and with an outer end of each rod extending outwardly through one of said chamber end openings, and including a pump operatively connected to said cylinder in a manner so as to cause a pressure differential between said first and second chambers, to move said piston thereby causing said rod outer ends to move through their respective chamber end openings, the improvement comprising:

an inner region and an outer region in each of said chamber end openings;

a seal positioned in said outer region;

means positioned in said inner region for providing a laminar leakage flow path from each chamber to an area inbetween said inner and outer regions;

a conduit interconnecting said area in one chamber end opening and said area in the other chamber end opening; and a hydraulic fluid accumulator connected to said conduit.

2. The electro-hydraulic actuator of claim 1, wherein said pump comprises a variable displacement hydraulic pump and a reversible brushless DC motor operably connected to said pump, wherein said pump and motor are mounted to said ram cylinder.

3. The electro-hydraulic actuator of claim 1, wherein said laminar leakage flow path means is a labyrinth type seal.

4. The electro-hydraulic actuator of claim 1, wherein said laminar leakage flow path means is a metallic piston ring type seal.

5. The electro-hydraulic actuator of claim 1, wherein said electro-hydraulic actuator is connected between a support and a member to be moved relative to said support, and said pump is normally in an operative condition only when said member is being moved relative to said support, and including:

control means for operating said pump, said control means being responsive to a control command that indicates a desired position of said member relative to said support, and also being responsive to loading on said member, wherein such loading may be biased to displace said member to a position away from that which is commanded by said control command, and wherein said control means senses such loading and operates said pump to cause a pressure differential in said chambers that compensates for such loading, to keep the member at its commanded position.

* * * * *

UNITED STATES PATENT AND TRADEMARK OFFICE
CERTIFICATE OF CORRECTION

PATENT NO.  : 4,667,472
DATED       : May 26, 1987
INVENTOR(S) : C. William Clay, et al It is certified that error appears in the above-identified patent and that said Letters Patent is hereby corrected as shown below:

On the title page assignee should read

--(73) Assignee: The Boeing Company, Seattle, Wash., part interest--.

Signed and Sealed this

Twenty-fourth Day of April, 1990

Attest:

HARRY F. MANBECK, JR.

Attesting Officer

Commissioner of Patents and Trademarks